(12) United States Patent
Hack

(10) Patent No.: US 11,444,439 B1
(45) Date of Patent: Sep. 13, 2022

(54) MECHANISM FOR LIMITING RACKING IN CIRCUIT BREAKER INTO CASE

(71) Applicant: National Breaker Services LLC, Middlebury, CT (US)

(72) Inventor: Bruce Hack, Yonkers, NY (US)

(73) Assignee: National Breaker Services LLC, Middlebury, CT (US)

( * ) Notice: Subject to any disclaimer, the term of this patent is extended or adjusted under 35 U.S.C. 154(b) by 132 days.

(21) Appl. No.: 17/005,078

(22) Filed: Aug. 27, 2020

(51) Int. Cl.
    *H02B 11/10* (2006.01)
    *H02B 11/133* (2006.01)

(52) U.S. Cl.
    CPC .......... *H02B 11/133* (2013.01); *H02B 11/10* (2013.01)

(58) Field of Classification Search
    CPC ... H02B 11/127; H02B 11/133; H02B 11/173; H02B 11/10; H02B 11/12; H02B 11/167; H02B 11/00; H02B 11/22; H02B 13/035
    USPC ......... 200/50.26, 50.21, 50.23, 50.24, 50.25, 200/50.17
See application file for complete search history.

(56) References Cited

U.S. PATENT DOCUMENTS

| | | | | |
|---|---|---|---|---|
| 3,783,209 A | * | 1/1974 | Cleaveland | H02B 11/133 200/50.25 |
| 8,497,439 B2 | * | 7/2013 | Pai | H01H 71/08 361/636 |
| 2010/0236904 A1 | * | 9/2010 | Capelli | H02B 11/28 200/50.23 |
| 2012/0199450 A1 | * | 8/2012 | Bower | H02B 11/127 200/50.25 |
| 2014/0260731 A1 | * | 9/2014 | Devanand | F16H 25/20 74/89.23 |
| 2016/0156164 A1 | * | 6/2016 | Yang | H01H 33/46 200/50.24 |
| 2016/0372899 A1 | * | 12/2016 | Gan | H02B 11/127 |
| 2017/0237241 A1 | * | 8/2017 | Benke | G06F 1/16 200/50.23 |
| 2017/0264084 A1 | * | 9/2017 | Mecca | H01H 71/025 |

* cited by examiner

*Primary Examiner* — William A Bolton
(74) *Attorney, Agent, or Firm* — Andrew S. Langsam

(57) ABSTRACT

A racked in and out circuit breaker for a cubical housing of electrical switchgear has a back to front, threaded rod mechanism and, at the rear of the cubical a stationary and interior threaded bolt is provided so that when the rod is turned the circuit breaker is mechanically pulled into the cubical and, if turned oppositely, causes the circuit breaker to move out of the cubical housing. A non-threaded section of the rod cooperates with the same bolt so that when it is within the threads of the bolt, further effort at rotating the rod prevents further rearward movement of the circuit breaker.

8 Claims, 16 Drawing Sheets

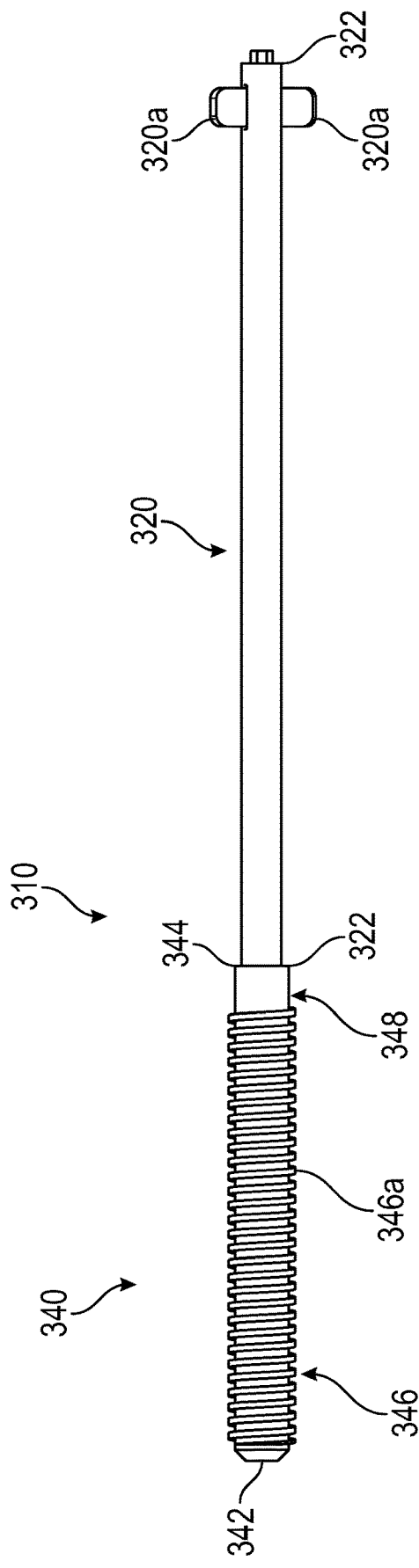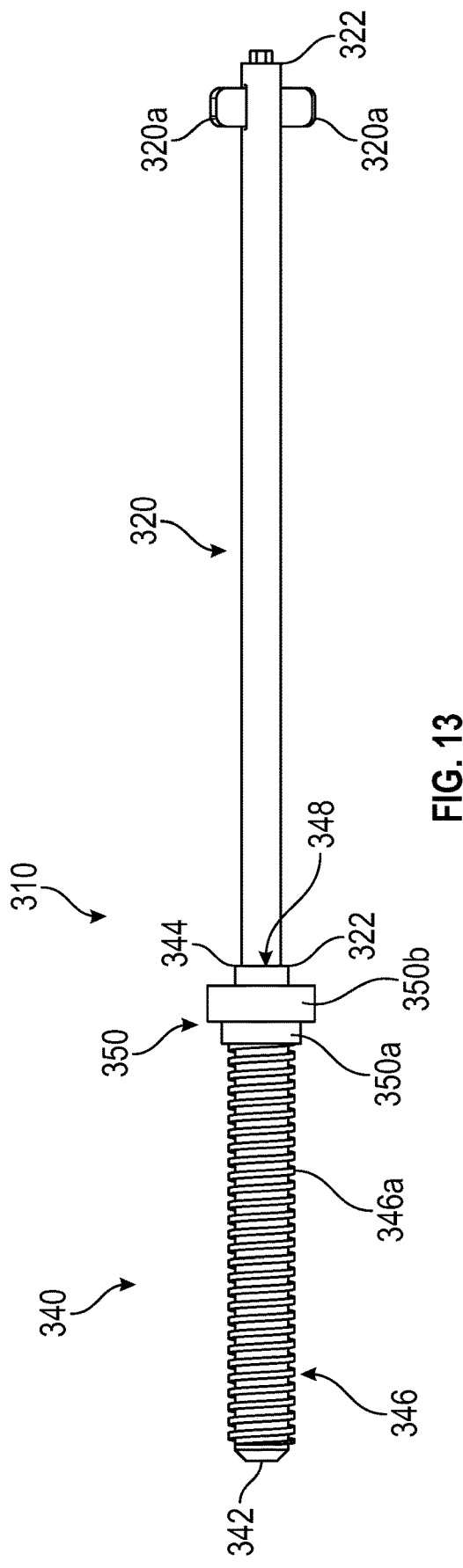

MECHANISM FOR LIMITING RACKING IN CIRCUIT BREAKER INTO CASE

TECHNICAL FIELD AND SUMMARY OF THE DISCLOSURE

The present application relates to a mechanism for automatically limiting the racking-in of a medium voltage circuit breaker into its associated draw-out cell (or cubicle) thus preventing cell damage as a consequence of overly racking in the circuit breaker or otherwise potential damage to the breaker's racking mechanism itself by overdriving in the withdrawal or racking-out direction. Protection is inherent in the design and relies on no external stopping devices.

BACKGROUND

In power distribution systems, there may be faults or defects that produce an excess current. Without mechanisms for limiting the damage due to that excess current, damage and destruction to the wiring, power distribution, components, etc. can result. For example, a common fault may be in the form a short circuit (sometimes resulting from an overload) which causes an electrical current to travel along a path having no (or extremely low) electrical resistance or impedance. That excess current may run through and cause damage to the electrical equipment or may overheat the wire that it is traveling through thereby starting a fire. The problem may be exacerbated by the fact that if the excess current is permitted to run freely throughout the power distribution system and related components, large amounts of electrical equipment, devices, wires or anything else connected within the distribution system could be damaged due to the excess current (due to their interconnectivity).

As such, to reduce and/or eliminate the damage to the system caused by the excess current, one or more switchgears (cubicles, cases or cabinets with circuit breakers therein) can be placed at strategic locations within the system. The switchgear may be a combination of any one of circuits, fuses, switches, and/or breakers that function to protect, control, minimize and/or isolate electrical equipment. When the switchgear detects an excess current, the switchgear activates to isolate the part of the system from which the excess current originated and from the downstream component(s). That action prevents the excess current from traveling to other parts of the system thereby limiting the damage. More specifically, switchgear (primarily comprising circuit breakers) perform the isolation via one or more circuit breakers contained therein. The circuit breakers activate to create a break in the electric circuit that forms a part of the electrical system. As is known, when the break in a circuit occurs, the current immediately stops flowing. This interrupts the excess current, and therefore prevents the excess current from flowing into another portion of the electrical system.

Circuit breakers can be grouped according to voltage classes, such as low (0-600V), medium (1001V through 40 KV), and high (above 40 KV). Common types of circuit breakers include air circuit breakers, vacuum circuit breakers, oil circuit breakers and gas circuit breakers. While many switchgears have built-in circuit breakers, there are also circuit breakers that are not built into the switchgear itself. In other words, the circuit breaker may form a separate, physically independent component from the other components of the switchgear. As such, an advantage of this configuration is that the circuit breaker can be removed for maintenance or even swapped with another circuit breaker as may be required.

To rack in the components and/or the separate circuit breaker(s) into the cubicle, case, cabinet or container, generally a long and threaded rod on the bottom of the slide-in and slide-out or movable circuit breaker or the switchgear may be used to mate with an aligned and stationary, threaded aperture located on or near the floor of the cubicle, case or container. The rod may mate with and then be rotated within the threaded aperture, such that the circuit breaker is moved or pulled into the case as a consequence of the threads of the rod passing through the aperture. This draws in or racks in the circuit breaker mechanism into its cubicle or case. Once the rod is no longer able to rotate—an indication that the threaded rod and its threads have reached the end of the threaded aperture, the operator should "sense" or feel that the circuit breaker is no longer being pulled into the case to stop the racking operation with the understanding that the circuit breaker is now fully engaged or fully racked-in. However, a problem may occur when excessive force is applied at the end of this rotational sequence, such that the circuit breaker is racked in too far or even possibly right up to and/or causing damage to the components or even through the rear of the container. In other words, the operator may accidentally or carelessly overturn or over rotate the racking-in rod thereby causing the circuit breaker to touch or even slam into the rear wall of the container. For example, the male set of contacts on the rear wall of the circuit breaker may damage and rupture the capturing and mating female electrical contacts on the rear wall of the case, or vice versa. Such action is damaging and may even create one or more short circuits. The explosion associated with the short circuit(s) may severely damage components and equipment and may also cause personal injury or death.

The present invention is directed toward minimizing or eliminating the potential for overly causing the circuit breaker of the switchgear to be racked into the case or cabinet.

SUMMARY

In general, in one aspect, exemplary embodiments of the present application provide a mechanism for limiting the racking in and out of a circuit breaker into and from a cubicle, container, case or cabinet of a switchgear. The preferred embodiment of the mechanism comprises a threaded connecting rod member rotatively secured to the bottom of the movable circuit breaker. According to the present invention, the rod is provided with a suitable length of a leading external threaded portion and a following, free, smaller in diameter and smooth, non-capturing or non-threaded portion. A capture block is preferably secured to the floor or base of the cubicle, cabinet, case or container. It comprises an apertured bolt, with internal screw threads that mate with the outside screw threads of the leading portion of the rod. Preferably as the capture block and bolt are matingly threaded to receive the connecting rod member the circuit breaker can move between a racked in position and a racked out position by rotating the connecting rod member (extending to the front of the movable circuit breaker) with respect to the capture block of the cubicle or container. When the connecting rod member's non-threaded portion, enters the threaded portion of the capture block, further turning of the rod will no longer pull the circuit breaker into the cubicle or case and this ensures against over racking in of the circuit breaker into said container. This will prevent over-racking in of the circuit breaker into its cubicle, case or cabinet and that will eliminate the potential damage to the components, a consequence of the otherwise present potential due to over racking in of the same.

Implementations of the various exemplary embodiments of the present application may include one or more of the following features. In a case that the circuit breaker is in the racked out position, the rotation of the connecting rod member in a first direction causes the circuit breaker to move to engage the capture block and pull the circuit breaker inwardly into the racked in position. The connecting rod member is rotatively secured to the circuit breaker that is configured to mate with the threaded aperture of the stationary bolt of the capture block, held securely in and to the cubicle or container of the switchgear, aligned with the axis of the rod. The bolt of the block is provided with a spring mechanism for biasing the bolt and its threads forwardly, i.e., towards the front of the cubicle or cabinet and to hold the bolt and its aperture and screw threads in position during initial entry of the connecting rod into the capture block. The connecting rod member includes a long shaft and one end of the shaft (near the front of the cubicle or cabinet, as the rod extends from front towards back of the movable circuit breaker) includes one or more lateral protrusions that are configured to connect with a racking tool (like a hand crank for an awning on a building) such that, as the racking tool rotates, it causes rotation to the rod and the circuit breaker moves in or out of the cubicle.

In general, in one aspect, exemplary embodiments of the present application provide a switchgear system comprising: a switchgear comprising a cubicle, case, cabinet or a container; and an inwardly slidable circuit breaker mechanism or carriage for aligning a set of contacts and circuit breaker(s) so that the electrical circuitry can be slid in and out of the cubicle, case, cabinet or container. A mechanism is provided to allow the sliding in and out of the circuitry to and from the cubicle so that a technician can easily access the electrical components, for repair and/or replacement.

The mechanism comprises a connecting rod member rotatively secured to the movable electrical components or circuit breaker and having an external threaded portion and a free or non-threaded portion and a capture block secured to the cubicle (preferably near the floor). As the capture block with the bolt member has screw threads that are matingly threaded to receive the leading threads of the connecting rod member, the circuit breaker can move between a racked-in position and a racked-out position by rotating the connecting rod member with respect to the bolt of the cubicle or container. However, over racking-in is prevented due to the connecting rod member's non-threaded portion which, when it meets the internal threads of the bolt of the capture block will no longer pull the circuit breaker inwardly into the cubicle or cabinet, even if further rotation of the rod is provided and this ensures against over racking in of the circuit breaker into the container. Racking out is accomplished by rotating the rod in the opposite direction, re-engaging the screw threats of the rod with the threads of the stationary bolt.

In general, in one aspect, exemplary embodiments of the present application provide: a switchgear system comprising: a circuit breaker; and a cubicle or container housing. The circuit breaker and the cubicle have at least one set of rail wheels and guide and support rails for precisely ensuring aligning and racking in the circuit breaker within the cubicle and selective removal.

A horizontally and laterally extending pull handle is preferably secured at or near to front and top of the circuit breaker for facilitating commencement of the racking in and completing the racking out of the movable circuit breaker from within the cubicle or container.

Implementations of the various exemplary embodiments of the present invention may also include one or more of the following features. A locking pull handle is provided which requires a second direction of movement than said first pull handle to disengage the circuit breaker from the container, after said circuit breaker and said container are otherwise mechanically and electrically disengaged.

BRIEF DESCRIPTION OF THE DRAWINGS AND THE EMBODIMENTS OF THE INVENTION

The aforementioned and other aspects, features and advantages can be more readily understood from the following detailed description with reference to the accompanying drawings wherein.

Figure 6:
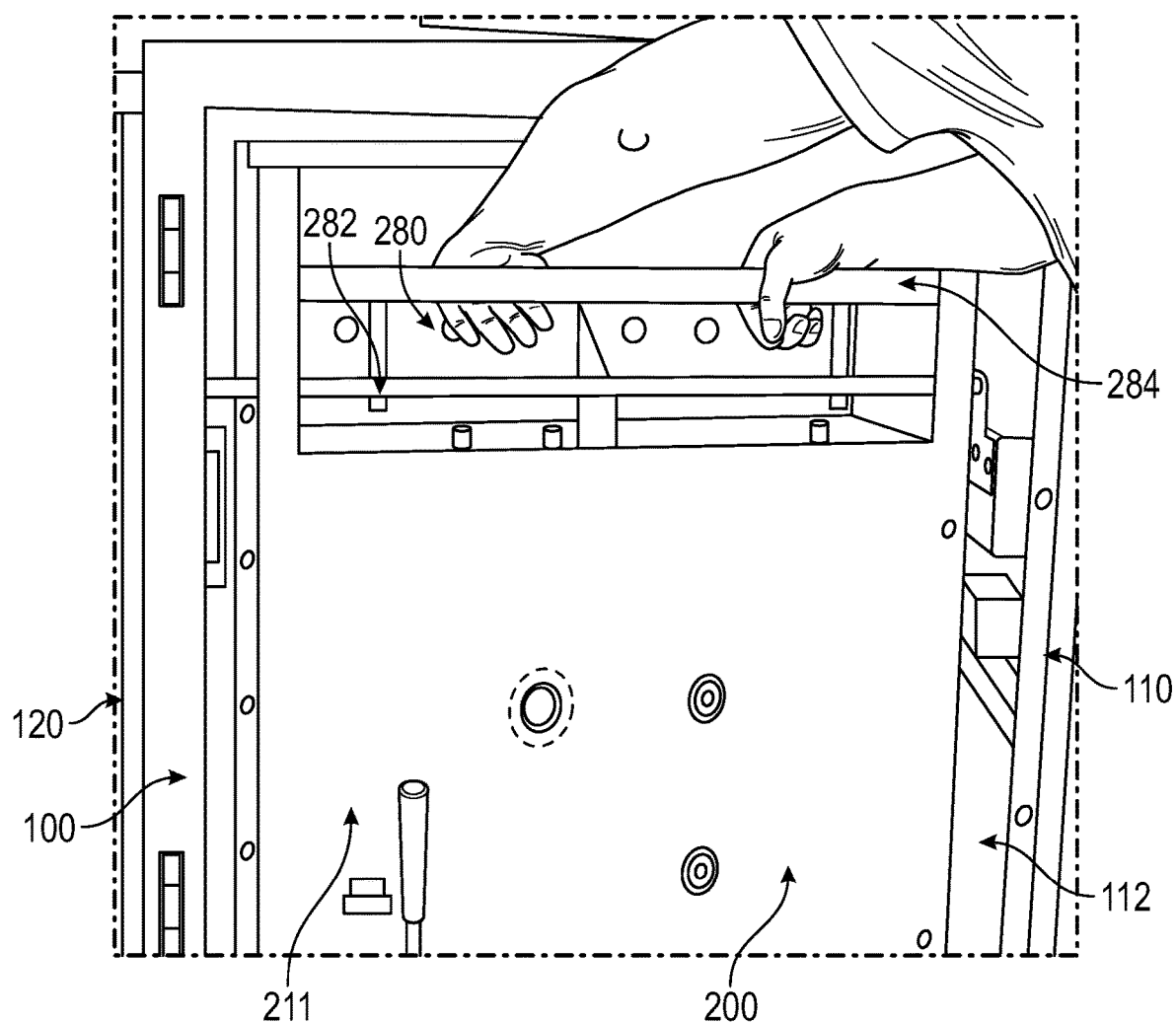
Figure 7:
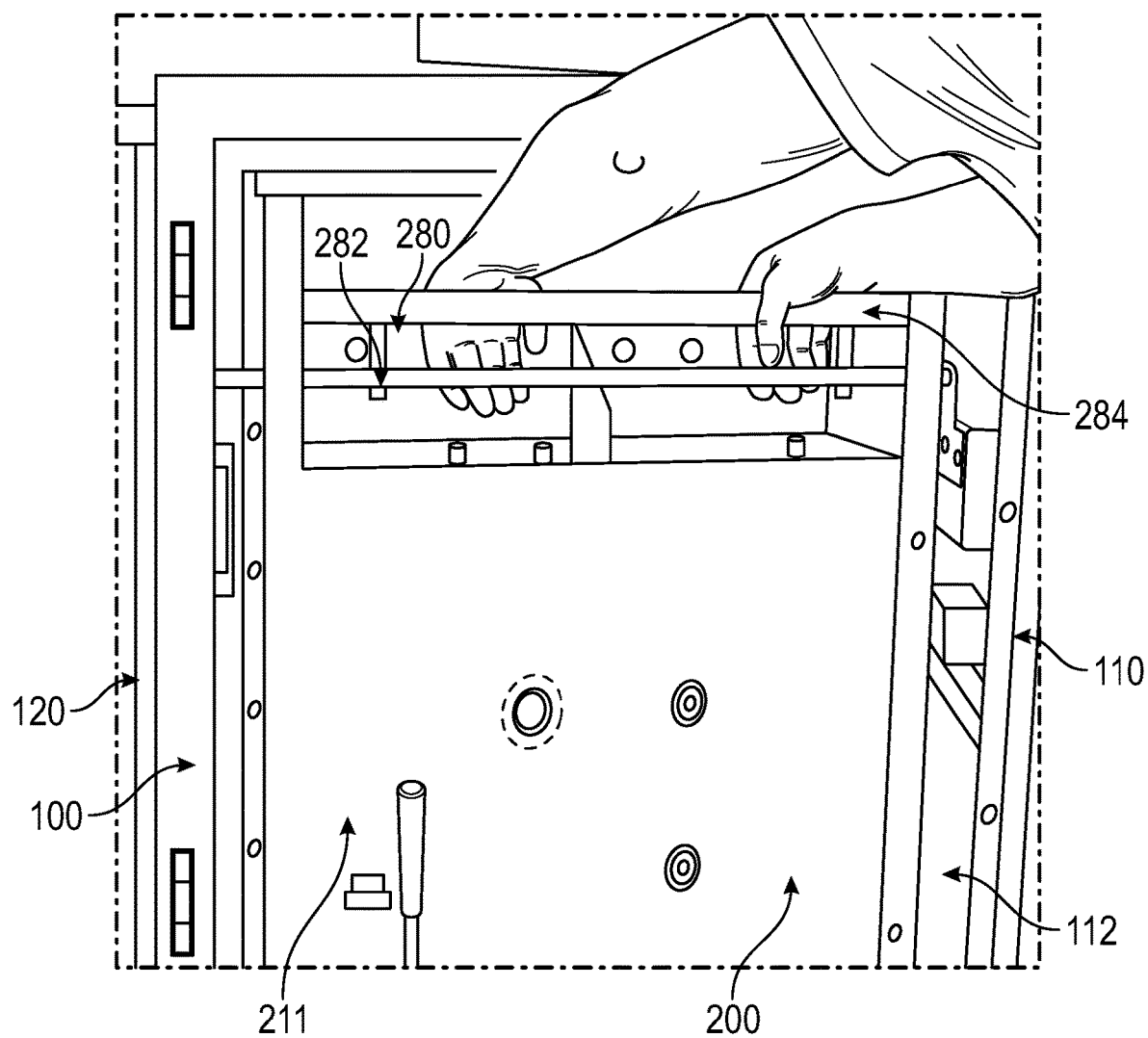
Figure 8:
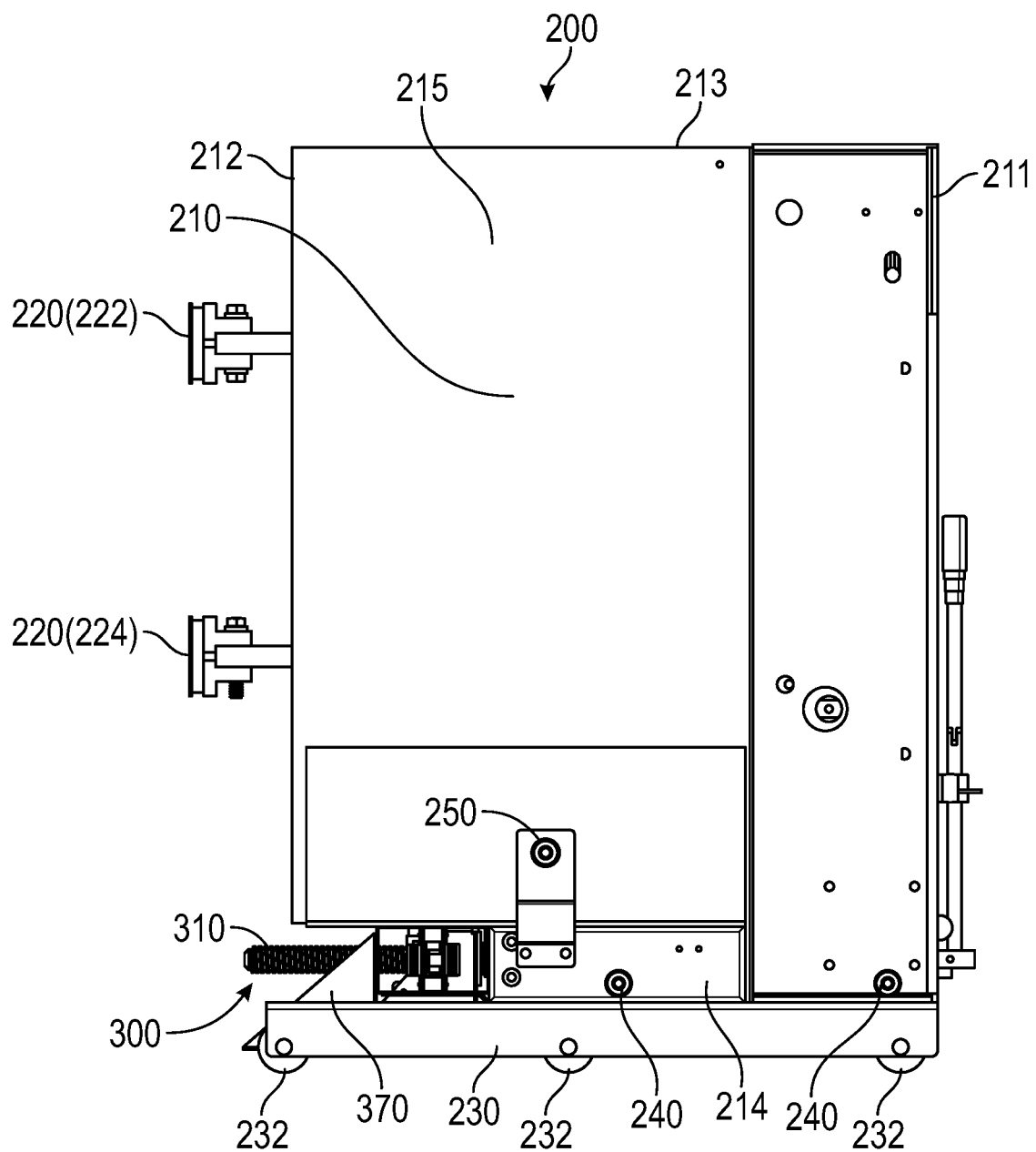
Figure 9:
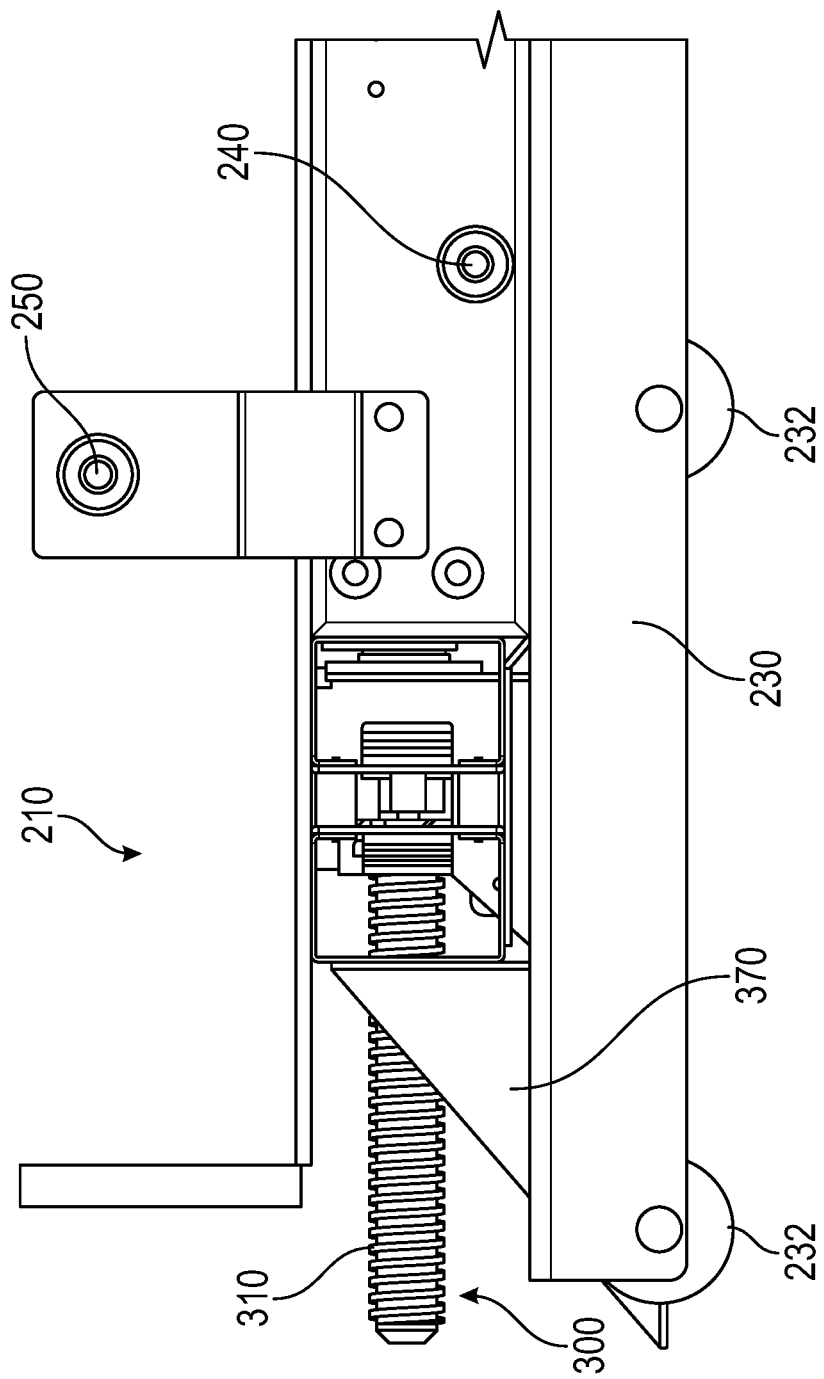
Figure 10:
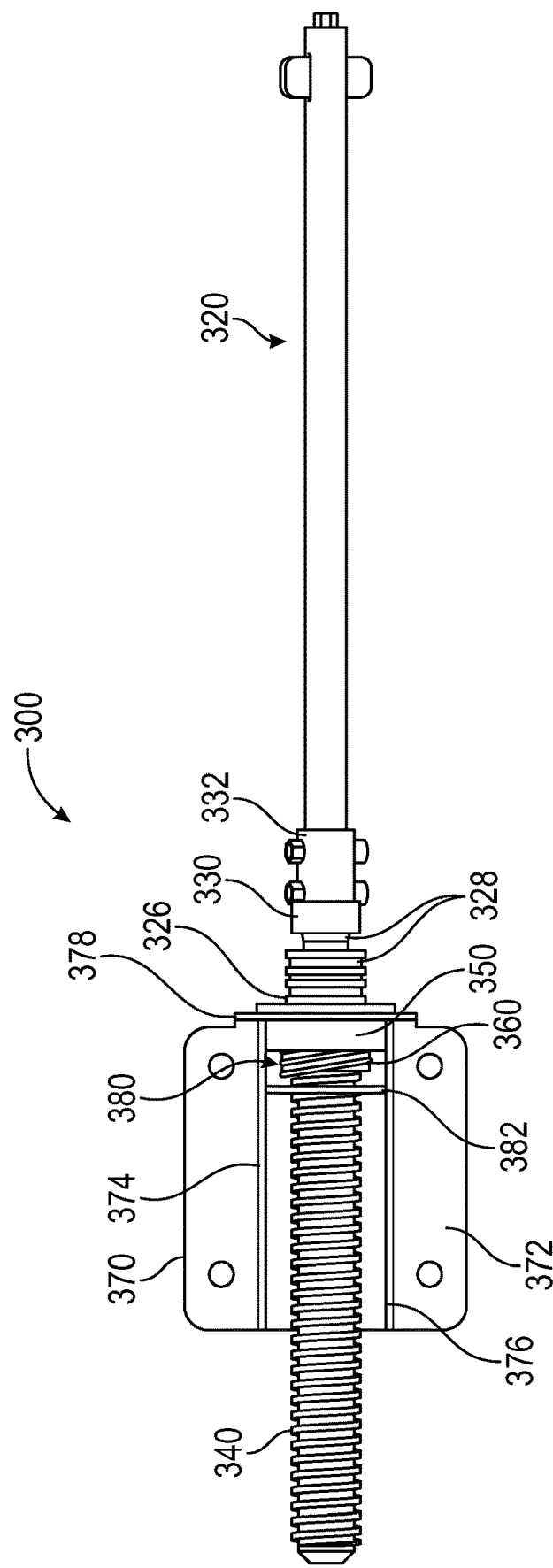
Figure 11:
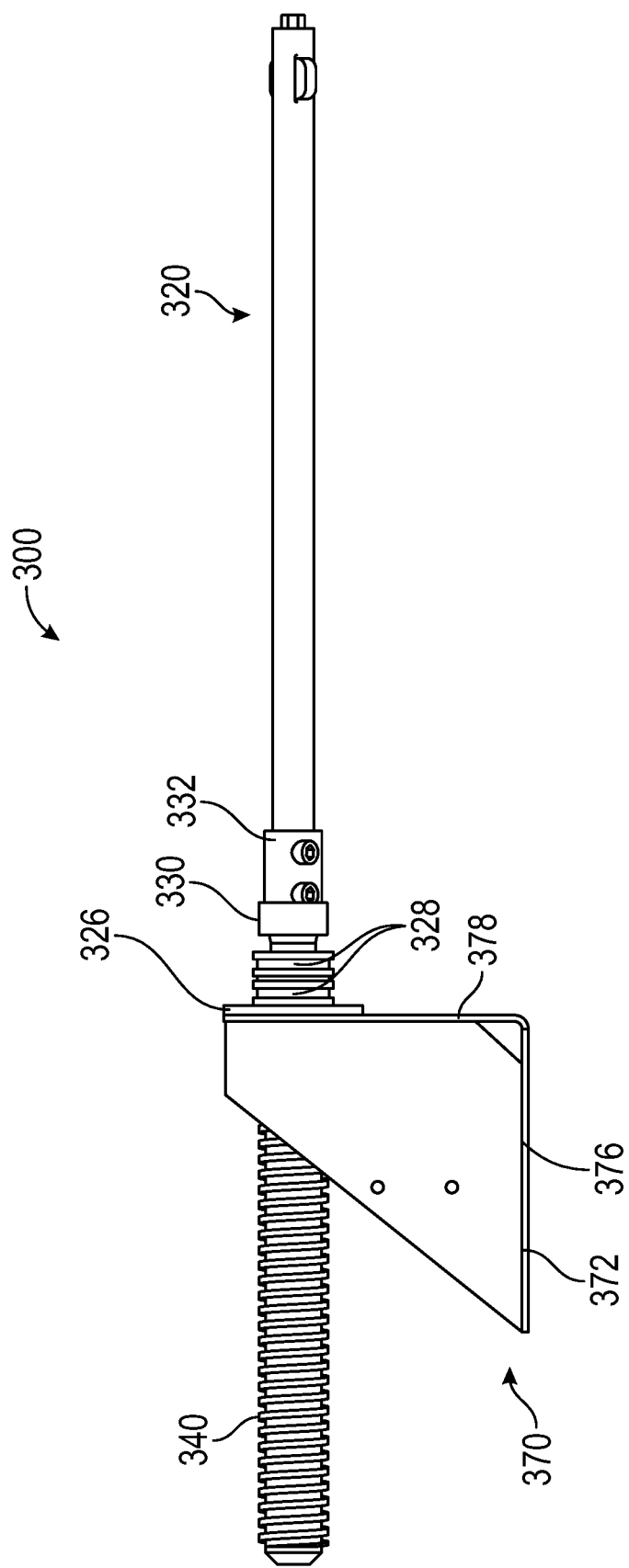
Figure 14:
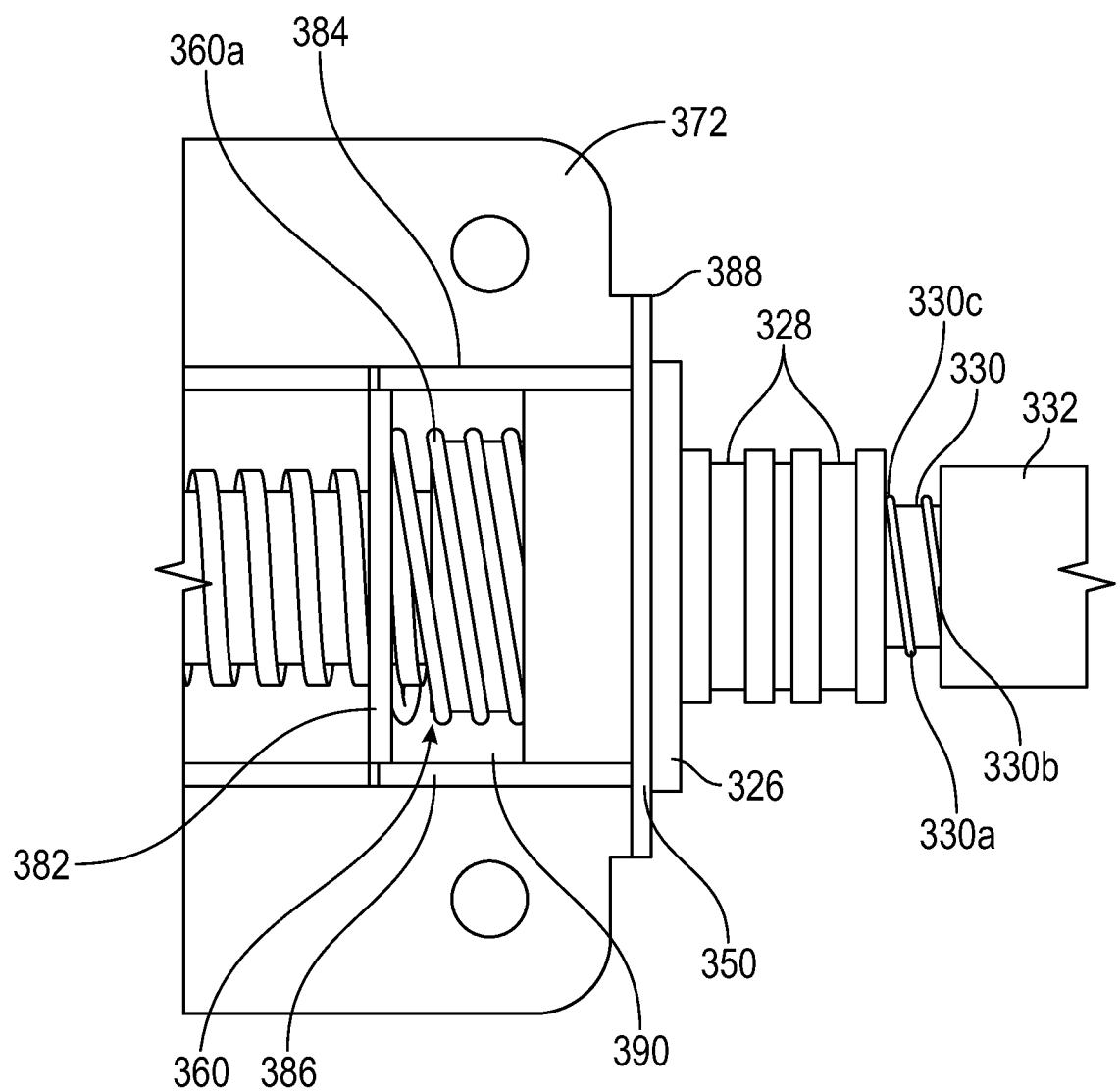
Figure 15:
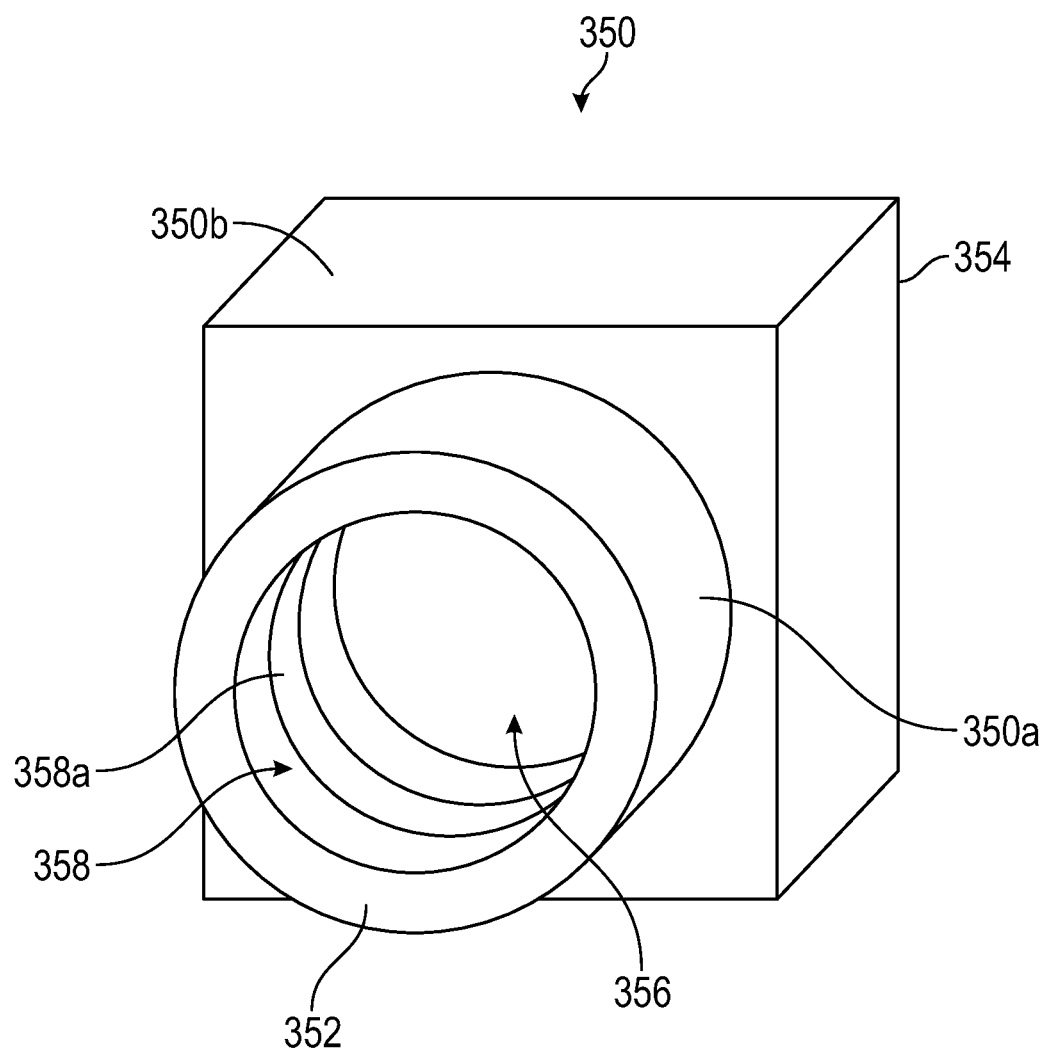
Figure 16:
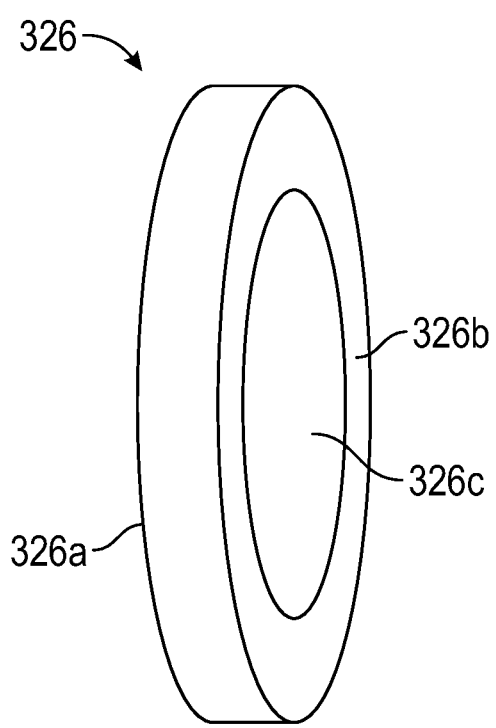
Figure 17:
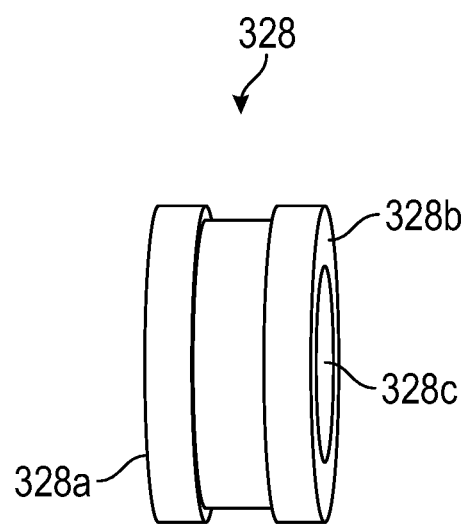
Figure 18:
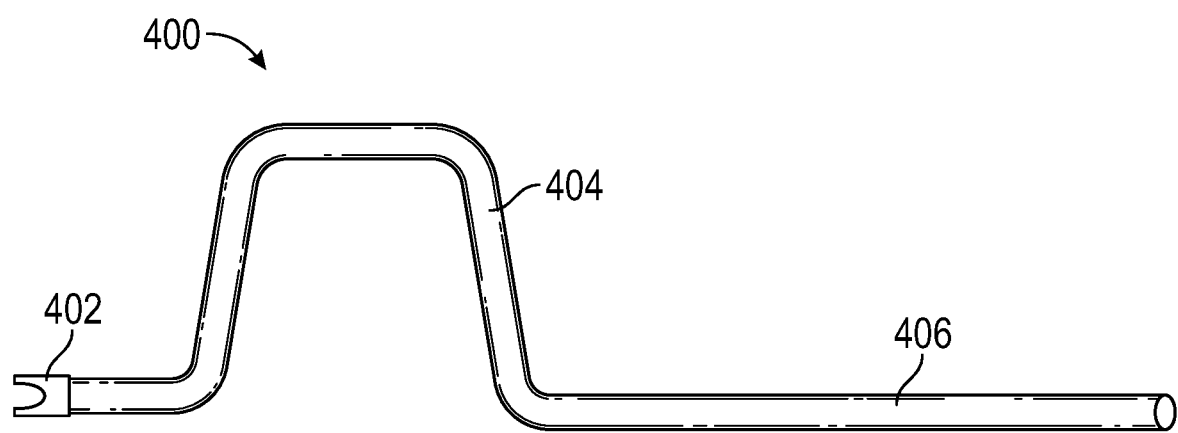

FIG. 6 shows a partial front view (along with two hands and arms of an operator) of the circuit breaker having an attached breaker-wide, withdrawing pull handle or mechanism, with the circuit breaker within the hollow interior cavity of the cubicle, in which the withdrawing mechanism (the second parallel rod) is in the locked position, according to another embodiment and feature of the present application;

FIG. 7 shows a partial front view of the circuit breaker and operator grasping the withdrawing mechanism (the second below-located rod) within the hollow interior of the switchgear, in which a locking bar of the withdrawing mechanism is being pulled upwardly to unlock the same, by two hands and arms of an operator, according to another embodiment of the present application;

FIG. 8 shows a left side view of the movable circuit breaker (outside of the cubicle);

FIG. 9 shows a left side, partial, yet enlarged and detailed side view of the rolling bottom section of the circuit breaker;

FIG. 10 shows a top view of the connecting rod mechanism, its forward or distal section and the capture block on the floor of the cubicle for the leading end of the rod, located preferably between the base of the circuit breaker and floor of the cubicle;

FIG. 11 shows a side view of the connecting rod mechanism and the capture block;

FIG. 12 shows a top view of the connecting rod member of the connecting rod mechanism;

FIG. 13 shows another top view of the connecting rod member as it is fully screwed into the capture block of the cubicle;

FIG. 14 shows an enlarged, partial, yet detailed view of the connecting rod and spring-biased capture block;

FIG. 15 shows an enlarged perspective view of the bolt and internal screw threads of the capture block;

FIG. 16 shows an enlarged perspective view of a cushion plate;

FIG. 17 shows an enlarged perspective view of a bearing on the front of the capture block; and FIG. 18 shows an example of a racking tool.

DETAILED DESCRIPTION OF THE DRAWINGS AND EMBODIMENTS OF THE INVENTION

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Figure 1:
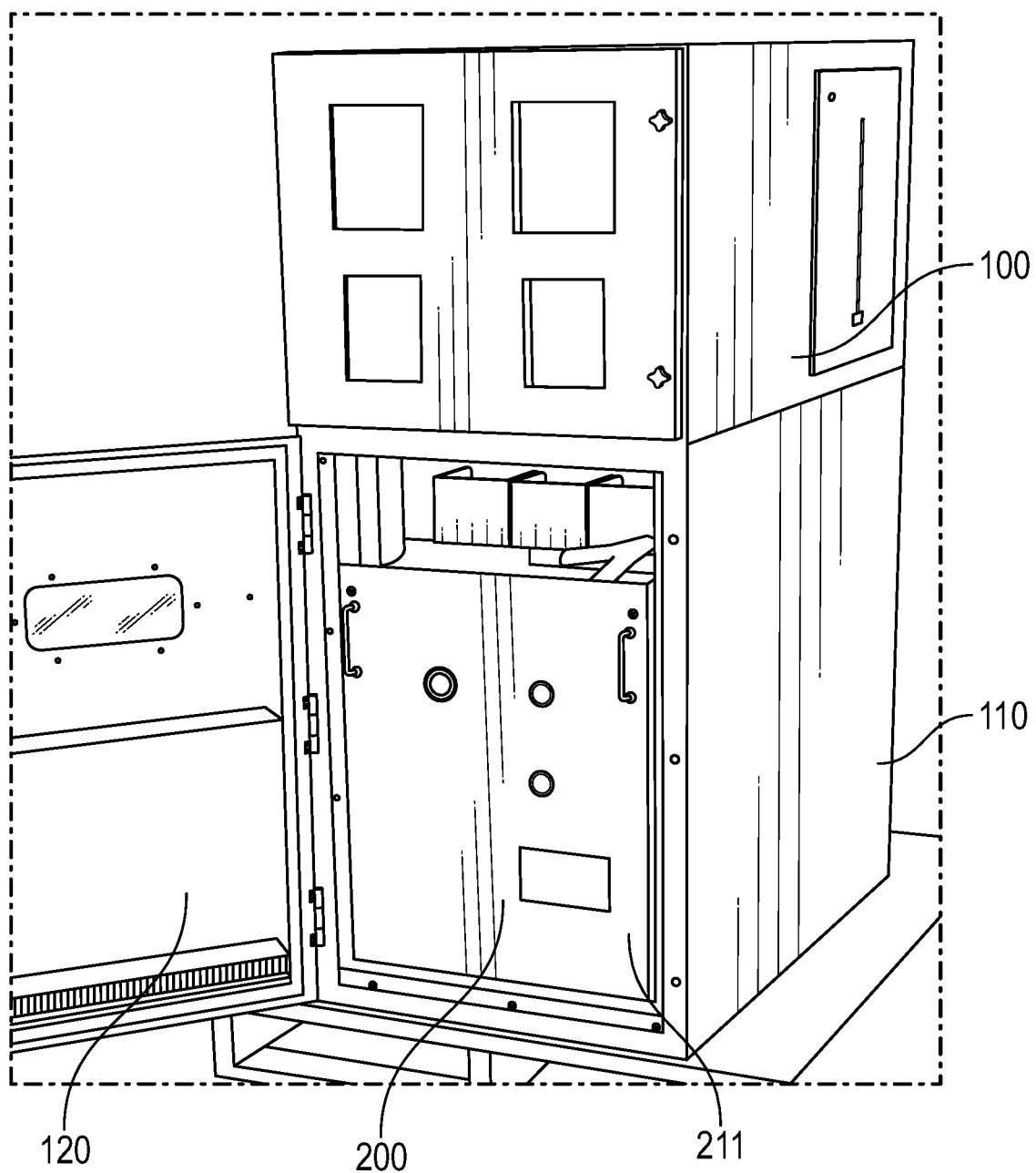
FIG. 1 shows a cubicle, case, container, cabinet or switchgear and a circuit breaker held within the hollow interior cabinetry of the switchgear (with its doors open), according to an embodiment of the present application.

FIG. 1 shows a cubicle, case, cabinet or switchgear 100, which with a circuit breaker therein may be a component within a system that monitors and includes electrical circuits. For example, the switchgear 100 may be placed within a power distribution system, in which the switchgear 100 protects one or more power distribution electrical circuits that are connected to switchgear 100. As such, the switchgear 100 may form an integral part of the electrical system. The system may be configured such that removal of the internal component of the switchgear interrupts (or stops) current flowing in the electrical circuits connected to the switchgear 100.

Figure 2:
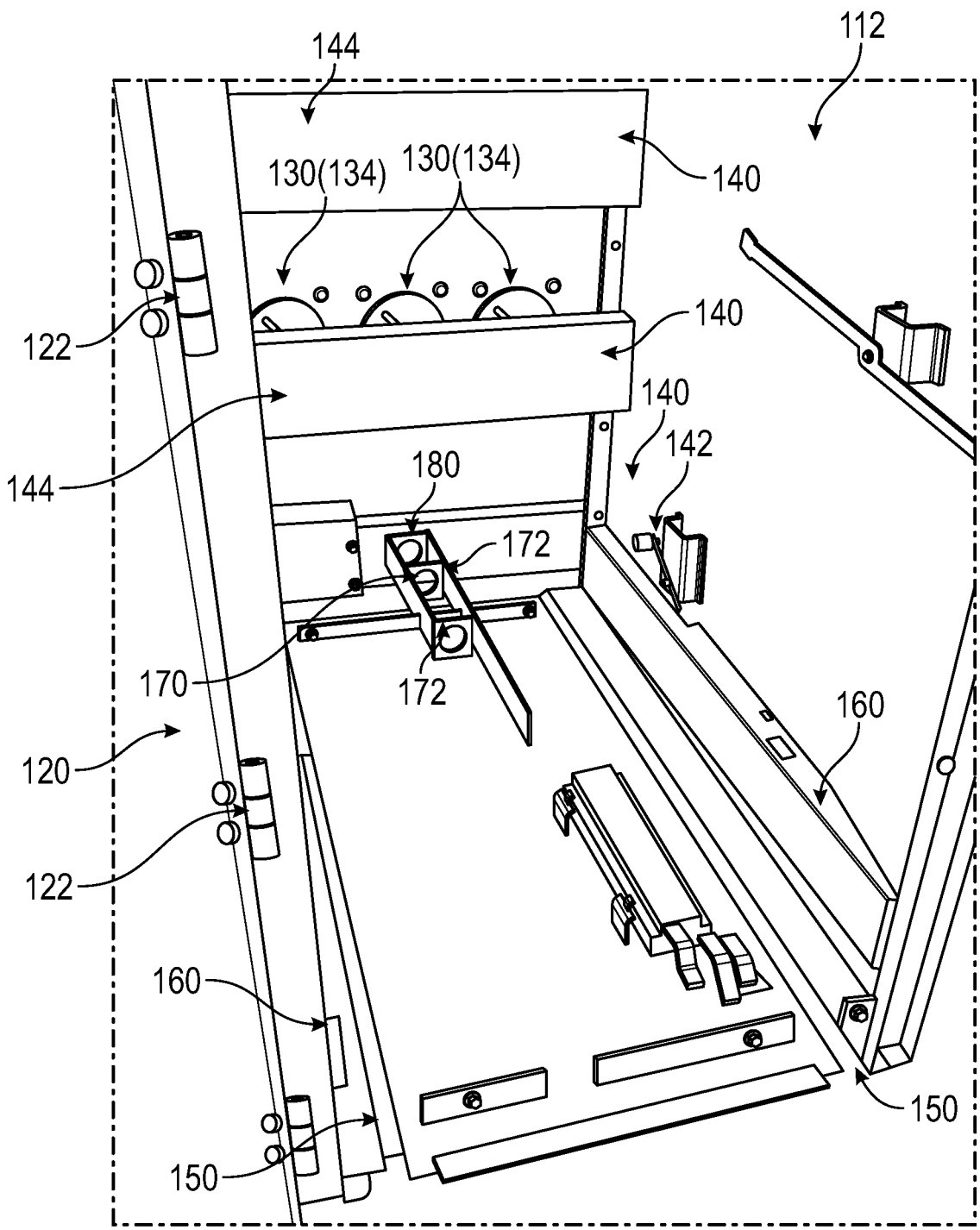
FIG. 2 shows a front and perspective view of the hollow interior of the switchgear when the circuit breaker is racked out or withdrawn from the switchgear.
Figure 3:
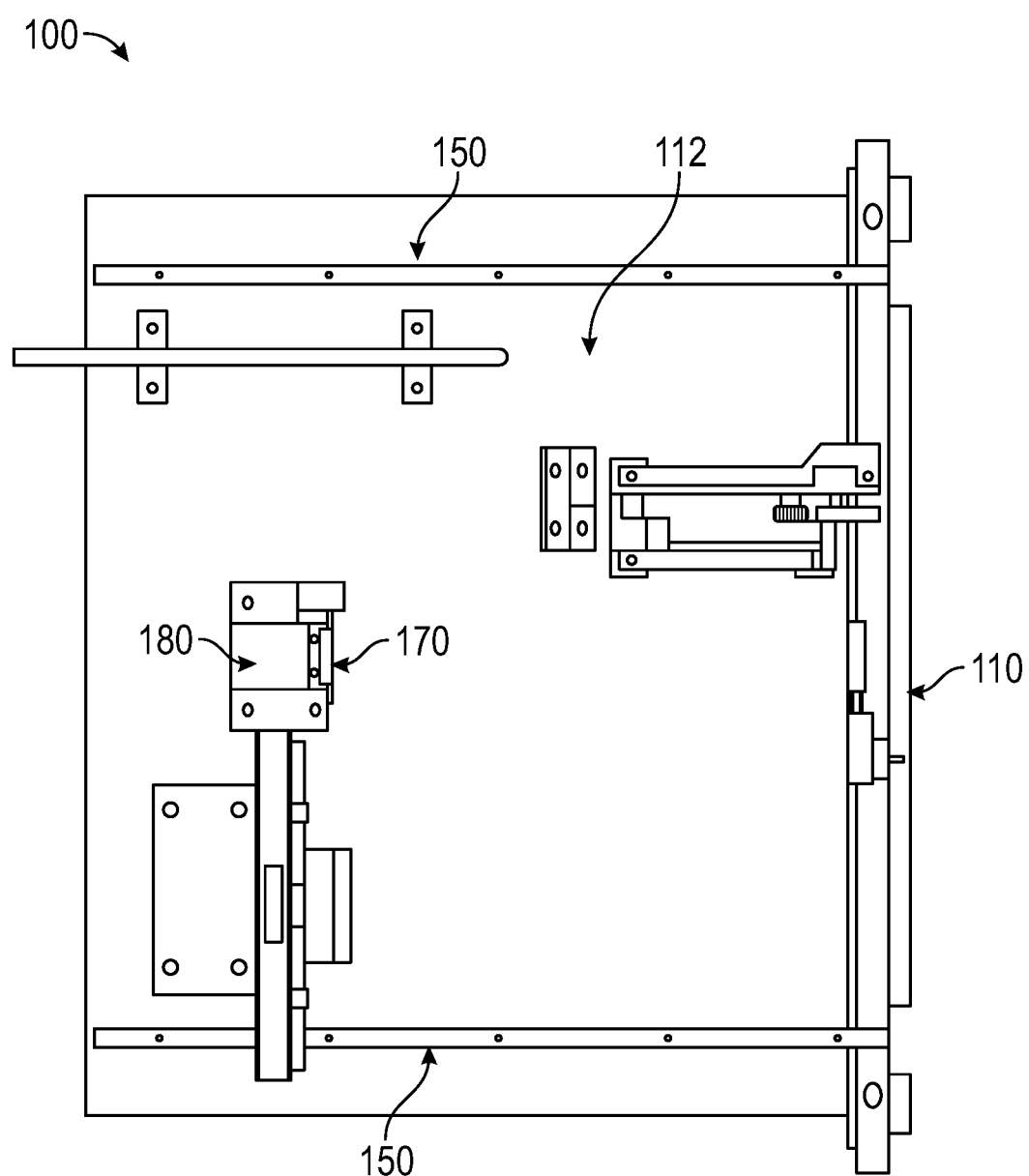
FIG. 3 shows a top plan view of a floor of the hollow cavity of the switchgear when the circuit breaker is racked out or withdrawn from the cubicle.

As shown in FIGS. 1-3, the switchgear 100 includes a cubicle, housing, case cabinet or container (or cell) 110, which defines a hollow interior 112 (see FIG. 2) that is configured to hold a set of electrical circuit breakers. The container 110 also includes a door 120, female contacts 130 (See FIG. 2), contact shield movement safety mechanism 140, bottom guide rails 150, and internal side rails 160. This is substantially common in today's circuit breakers of large (non-residential sizes). In the present embodiment, the cubicle of the switchgear 100 and the circuit breaker 200 are separate components. The circuit breaker 200 can be racked out or engaged (for repair and/or replacement) or be disengaged from the cubicle of the switchgear 100, or racked in for electrical connection.

A receiving or capture block member 370 and an internally threaded bolt member 350 (See FIGS. 9, 10, 11, 13, 14 and 15) with a central threaded aperture is provided. FIG. 1 also illustrates a circuit breaker housing 200 that includes a box-like body 210 (see FIG. 4), male contacts 220, a parallel and opposed set of rails and wheels structure 230, guiding wheel protrusions 240, one or more trigger arms 250 and a connecting rod mechanism 300. The rod for engaging the threaded bolt for moving the circuit breaker in and out of the cubicle or cabinet generally extends between the front and rear of the circuit breaker, middle between the two sides and on the bottom of the circuit breaker.

The door 120 of the switchgear 100 is connected to the cubicle or container 110 via internal hinges 122. The door 120 has an open position and a closed position. In the open position, the door 120 allows entry of the circuit breaker 200 into the hollow interior 112 of the cubicle or container 110. In the closed position, the door 120 protects the face panel, components (e.g., female contacts 130) inside the container 110 or any object (e.g., circuit breaker) that can be held within container 110. The female contacts 130 (See FIG. 2) are electrical contacts that are configured to electrically receive and connect with the respective male contacts 220, which are also electrical contacts. When connected, circuits are complete and power flows. As such, when the circuit breaker 200 is racked out from the cubicle or container 110 of the switchgear 100, the disengagement of the female electrical contacts 130 from the corresponding male contacts cause an open circuit. In the open circuit condition, there is no electrical current flow in the electrical circuit that is connected to the switchgear 100. On the other hand, when the circuit breaker 200 is racked into the cubicle or container 110, the male contacts 220 mate (electrically connect) with the female contacts 130, which changes the open circuit to one or more closed circuits. As such, it is possible for an electrical current to flow through the switchgear 100 to the circuit breaker 200 and electrical power to one or more circuits results (at least until a circuit breaker acts to stop current flow in the circuit).

The contact shield safety mechanism 140 protects the female contacts 130. For example, when the circuit breaker 200 is racked out from the switchgear 100, the female contacts 130 may potentially be exposed to damage from outside sources. A damaged female contact 130 may cause a short circuit, thereby increasing the possibility of damage, even an explosion. To protect female contacts 130 from such damage, the contact shield safety mechanism 140 may include one or more lever arms 142 and one or more vertical movable plates 144 that are connected to the lever arm(s) 142. Each of the plates 144 may be, for example, wide enough to protect or shield one or more female contacts 130 and of sufficient height to protect the male connectors. The plates 144 may be capable of moving from a protected position to an unprotected position, and vice versa, depending on the engagement or not of the contact shield safety mechanism with the trigger arms. For example, the plates 144 may be initially disposed directly in front of the female contacts 130 (i.e. in the protected position). The plates 144 can move (e.g., vertically up or down) so that the plates 144 may no longer be directly in front of the female contacts 130, which allows the female contacts 130 to be exposed for mating with the male contacts 220 when the circuit breaker is racked into the cubicle or case.

The lever arms 142 may be utilized to facilitate such movement by moving from an untriggered position to a triggered position, or vice versa. When the lever arms 142 are in the untriggered position, the lever arms 142 allow the plates 144 to remain in a protected position, so as to shield the female contacts 130 from harm. When the lever arms 142 are in the triggered position, the plates 144 are mechanically raised or moved to an unprotected position to allow the female contacts 130 to be exposed and capable of mating with the male contacts 220. The lever arms 142 may be moved to the triggered position by physical camming, a consequence of the trigger arms 250 (see FIG. 4) of the circuit breaker 200.

The bottom rails 150 are parallel and extend front to rear, too, and configured to receive the rail supported wheels 232 (see FIG. 4) of the circuit breaker 200, so as to support and guide the circuit breaker 200 into a position that allows the male contacts 220 of the circuit breaker 200 to be aligned with the female contacts 130 of the switchgear 100 and, at the same time, the lever arms 142 are cammed by the trigger arm 250, to expose the female contacts 130 for receipt of the male contacts 220. As such, a person racking in (or racking out) the circuit breaker 200 is not forced to make many manual adjustments or electrical connections for aligning the male contacts 220 of the circuit breaker 200 with the female contacts 130 of the switchgear 100. Likewise, the internal side rails 160 of the case (see FIG. 2) are configured to receive the guiding wheeled protrusions 240 of the circuit breaker 200, so as to also support and guide the circuit breaker 200 into a position that allows the male contacts 220 of the circuit breaker 200 to be aligned with the female contacts 130 of the cubicle or case or cabinet of the switchgear 100. Moreover, the interaction between the internal side rails 160 and the guiding wheeled protrusions 240 also allows the stabilization of the circuit breaker 200, when the circuit breaker 200 is being racked into (or racked out of) the cubicle, by preventing the circuit breaker 200 from tipping on either side. Such tipping may cause a misalignment between the female contacts 130 and the male contacts 220 possibly resulting in physical damage.

The receiving member 170 (see FIGS. 2 and 3) may be a structure that is configured to interact with the connecting rod mechanism 300, so as to securely connect the circuit breaker 200 within and to the cubicle. The capture block or receiving member 170 may include one receiving bolt member with a central threaded aperture 172. The threaded aperture provides an opening that includes an internally threaded portion 182 which in turn includes internal grooves (i.e., female thread) 182a that are configured to interact with the outside screw threads of the connecting rod mechanism 300 so as to securely guide and connect the circuit breaker 200 to the cubicle. The threaded aperture may be concentric with the one or more receiving apertures.

The body 210 of the circuit breaker 200 may include electrical circuitry and components that allow the circuit breaker 200 to function to create a break in the electrical circuit so as to interrupt excess current flow. Depending on the design of the circuit breaker 200, the circuit breaker 200 may include different variations for performing such interruption. For example, circuit breakers may include internal contacts that are initially closed, but separate when the circuit breaker detects excess current. When the internal contacts separate, an electrical arc or separation is formed between the internal contacts. The electrical arc can be extinguished by mediums such as air, gas or oil. Further, a vacuum environment can be utilized to extinguish the electrical arc as well. Consequently, by extinguishing the electrical arc, the excess current flow is safely stopped. As such, the body 210 may include any internal components that are designed to interrupt excess and unwanted current flow.

As shown in FIGS. 3-9, the body 210 includes a front side 211, a back side 212, a top side 213, a bottom side 214, a right side 216 and a left side 215.

Figure 4:
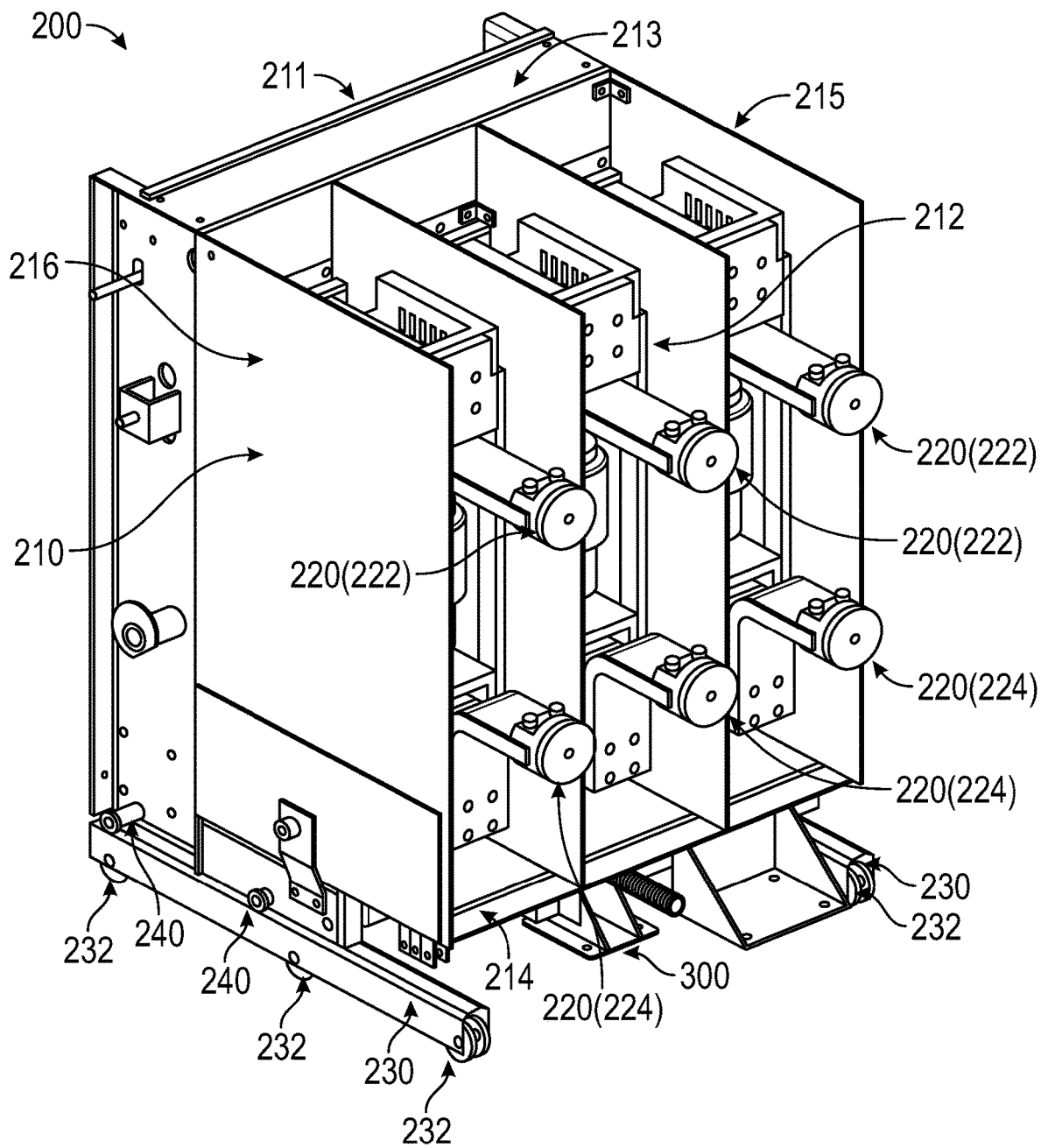
FIG. 4 shows a rear, top and side perspective view of the circuit breaker (outside of the cubicle, case or switchgear)
Figure 5:
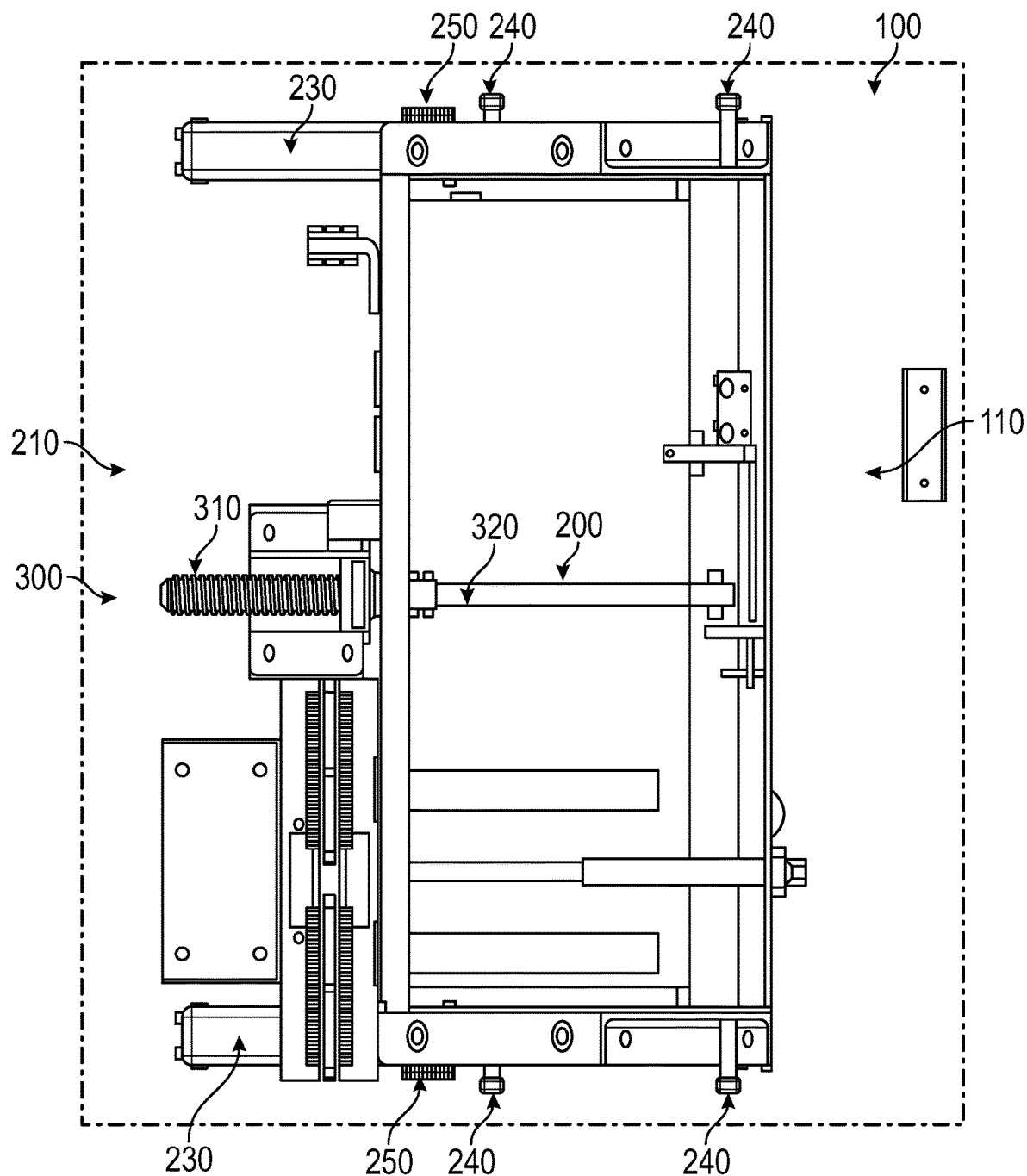
FIG. 5 shows a top view of the movable circuit breaker's bottom, rolling and connecting section when the circuit breaker is racked into the cavity cubicle, case, cabinet, container or switchgear.

The male contacts 220 extend from the back side 212 of the body 210. As shown in FIGS. 4 and 8, the male contacts 220 may come in a first male set 222 and a second vertically staggered male set 224. The first male set 222 is configured to be connected to a first female set 132 (not shown but behind vertically movable plate 144) of the female contacts 130 and the second male set 224 is configured to be connected to a second female set 134 of the female contacts 130 (behind the lower of the plates 144). When the male contacts 220 mate with the female contacts 130, a complete closed circuit is formed such that electricity can flow through the first and second female sets 132 and the first and second male sets 122.

The wheel structure 230 (see FIG. 4) is disposed at the bottom side 214 of the body 210. The wheel structure 230 includes one or more wheels 232 on wheel support shafts or axles. By having the wheels 232, the circuit breaker 200 may be easily racked in and out (e.g., pushed or pulled) without having the weight and bulk to be lifted or carried via another transport device. When the circuit breaker 200 is in front of the cubicle or container 110 of the case or cabinet of the switchgear 100 (and ready to be racked in) the wheels 232 are aligned with the bottom rails 150, and the circuit breaker 200 then gently, slowly partially pushed into the cubicle or container 110. The guiding wheels or protrusions 240 may include shafts that are configured to cooperate with the side rails 160 so as to also guide the circuit breaker 200 into the cubicle or container 110. The guiding protrusions 240 outwardly extend from both the right side 216 and the left side 215.

The trigger arms 250 may be any type of arm or protrusion that extend outwardly from at least one of the right side 216 and the left side 215. The trigger arms 250 are configured to cause the respective lever arm 142 to move from an untriggered position to a triggered position. When the respective lever arm 142 moves from an untriggered position to a triggered position, the respective lever arm 142 causes the respective plates 144 to be moved (upwardly) to an unprotected position so as to allow the female contacts 130 to be capable of mating with the male contacts 220. When the trigger arms 250 contact the lever arms 142, the respective lever arm 142 remain in the triggered position. However, once the trigger arm 250 is no longer contacting the lever arm 142, the lever arm moves automatically back to the untriggered position thereby causing the plates 144 to mechanically move back to the protected position. This can only happen if the circuit breaker is at least partially moved or racked out of the cabinet.

In an exemplary embodiment of a separate aspect of the present invention, as shown in FIGS. 6 and 7, the circuit breaker 200 may also include a withdrawing handle mechanism 280, which includes a horizontal, locking assist and pull handle assembly 282 and a primary handle 284. The primary handle 284 and the below-located and parallel assist and pull handle 282 may be horizontal rods that cooperatively act with one other. For example, the assist pull handle 282 may be disposed vertically below and is movable with respect to the primary handle 284. The handle mechanism is helpful in withdrawing of the circuit breaker or to rack in the device into the cubicle or cabinet. The mechanism 280 helps to rack in and out the circuit breaker and to align and move the same when the circuit breaker is disengaged from the cabinet. The assist handle 282 is capable of vertically moving with respect to the primary handle 284. The withdrawing mechanism 280 includes a locked position in which the circuit breaker 200 is locked within the cubicle or case 100 and an unlocked position in which the circuit breaker 200 can be moved into alignment for racking in or removed or racked out from the cubicle or case or switchgear 100. In FIG. 6, the case is currently locked by the withdrawing mechanism 280, which is in the locked position. To rack out the circuit breaker 200, after the rod is disengaged from the threaded bolt, an operator needs to move the withdrawing mechanism 280 to the unlocked position. The locking assist pull handle 282 is pulled upwards towards the primary handle 284, i.e., in an upward direction. Such action causes the withdrawing mechanism 280 to move to the unlocked position. Thus, the circuit breaker 200 can be easily further slid out and removed or racked out from the cubicle. The mechanism is similar to that used in shopping carts and luggage carts at airports. Movement of the circuit breaker is allowed when the two horizontal bars are held close to one another and a mechanical braking mechanism, like that on shopping carts, is released whereas when the two bars are in their non-contact by operator position, the braking mechanism on the circuit breaker serves to hold the same in position.

The connecting rod mechanism 300 allows the circuit breaker 200 to be securely and precisely connected to the cubicle, cabinet, case or switchgear 100 with male contacts in contact with female contacts for electrical circuit flow. For example, a connecting rod mechanism 300 may be included with the circuit breaker 200, so as to prevent the circuit breaker 200 from being overly racked into the cabinet or case and accidentally damaging internal components of the circuit breaker, the switchgear 100, or downstream circuitry. The mechanism may be and is preferably disposed on the bottom side 214 of the body 210 of the circuit breaker 200. As shown in FIGS. 8-17, the connecting rod mechanism 300 includes a long-threaded rod or connecting member 310 extending from front towards the back of the circuit breaker, somewhere between the left and right sides and secured to the bottom of the circuit breaker. It has external screw threads, at least at its distal end. A bolt-holding capture block 350 is secured to the floor of the cabinet. It has internal screw threads which mate with and capture the distal end of the connecting rod. An elastic ring or helical spring member 360 is forwardly biased and a supporting plate member 370 is provided to serve to locate the bolt vis a vis the head end of the rod.

The proximal end of the shaft 320 is rotatively secured to the front, bottom of the circuit breaker and includes one or more lateral notches forming protrusions 320a. Such protrusions 320a may connect or interlock with lateral pins of a racking tool (see FIG. 18) such that by rotating the racking tool, the rod or connecting member 310 is rotated as well. This works like the awning projecting tool for the front side of a store front or building.

The fastening and connecting section 340 of the rod comprises a rounded tip at the distal end 342 and a second end 344. End 344 is a continuation of the unthreaded portion of the rod extending between the proximal end with protrusions 320a and the proximal thread of the connecting section. The fastening section 340 comprises an external threaded portion 346 that includes one or more helical threads or ridges 346a (i.e., an external male thread) that is configured to mate with the internal threads or groove of the aperture of the bolt secured to the bottom of the cubicle or case or switchgear 100, so as to connect the connecting rod mechanism 300 (and by extension the circuit breaker 200 itself) to the cubicle.

The fastening rod member 340 also includes a non-threaded section 348 between the end of the rod 344 and the proximal end of the rod. That free or non-threaded section starts precisely at 344 so that when the circuit breaker is fully received or racked into the cubicle, the free or non-threaded end of the rod is distal to the screw threads of the aperture of the capture bolt so that further turning of the rod will not result in any further inward movement of the circuit breaker within the cubicle. This is a safety stop and prevents further racking in than desired and protects the electrical equipment. The free or non-threaded portion 348 includes a continuous surface that is smooth, i.e., it is non-threaded. For example, the free portion 348 may not have any helical ridges or any other protrusions or threads thereon. The fastening rod member 340 at its non-threaded section is configured to pass through and freely rotate within the receiving aperture 172 of the bolt (with threads of aperture receiving member 170 or capture block). The fastening rod member 340 is configured to mate with the internally threaded aperture 190 and its screw threads of the container 110. As such, the helical ridges 346a (and by extension the threaded portion 346) are capable of meshing with the internal grooves 182a (and by extension the threaded portion 182) of the threaded aperture 190 of the bolt and capture block. As a result of mechanical interaction of the rotatable screw threads of the rod and the internal bolt of the capture block, the circuit breaker 200 becomes racked in and secured to the cubicle 100, and yet, when moved sufficiently inwardly, when the free or non-threaded end of the shaft is located within the threaded aperture 190, further rotation of the connecting rod (by the tool) will not result in any further racking in of the circuit breaker into the case. Further turning of the rod 340 will not result in any further racking in of the circuit breaker 200 to the reduction of damage to the components.

As shown in FIGS. 14 and 15, the capture block 350 includes a first end 352, a second end 354 and an opening 356 extending from the first end 352 to the second end 354. The opening 356, for example, is a through-hole. The opening 356 may be configured to receive the fastening rod member 340. As such, the opening 356 may have a radius that is capable of accommodating the fastening rod member 340, such that the fastening rod member 340 can be fitted into the opening 356. Further, the sidewall defining the opening 356 may have an internal threaded portion 358 that includes one or more grooves 358a (i.e. internal female thread) such that the external threaded portion 346 of the rod 340 is capable of mating with the internal threaded portion 358, thereby allowing the fastening rod member 344 to pass through the block 350 from the first end 352 to the second 354 or vice versa. More specifically, the helical ridges 346a of the rod 340 interlace (or interweave, interlock, mesh etc.) with the threads or grooves 358a, such that the helical ridges 346a ride along the grooves 358a, thereby allowing rotational movement of the fastening rod member 340 to racking in of the circuit breaker 200. The block 350 may include a first portion 350a and a second portion 350b. The first portion 350a may, for example, include a cylindrical shape. On the other hand, the second portion 350b may include a cube shape. The first portion 350a and the second portion 350b may be permanently connected to each other. Thus, the first portion 350a and the second portion 350b may be integral to one another. For example, the entire block 350 may be machined, molded or carved from a material to produce the first portion 350a and the second portion 350b.

The elastic or helical spring member 360 may be an object that is capable of resisting distorting force (in which such force distorts the original size of the elastic member 360) and that is capable of returning to its original size when such distorting force is removed. It biases the bolt forwardly, towards the front of the cabinet. For example, the elastic member 360 may be a spring (which may include steel material) that includes a coil 360a, which allows the elastic member 360 to store and release mechanical energy or to absorb shock.

A method for the circuit breaker 200 to engage (rack into) the cubicle, cabinet or case by an operator (e.g., person racking in/out the circuit breaker 200 into the cubicle) is shown and described herein. First, the door 120 of the container 110 is moved to an open position, thereby exposing the hollow interior or cavity 112. The new or refurbished circuit breaker 200 is moved to directly in front of the hollow interior or cavity 112. Movement is facilitated by the pull handles which releases any braking of the support wheels of the circuit breaker. The wheels 232 of the circuit breaker 200 are then aligned with the bottom rails 150, while the guiding protrusions 240 are aligned with the side rails 160. The threaded rod of the circuit breaker 200 is then aligned with the threaded aperture of the bolt in the capture block secured to the bottom of the cubicle. Next, the circuit breaker 200 is gently pushed further into the hollow interior 112 until the first and rounded end 342 of the fastening rod member 340 passes through each of the one or more receiving apertures 172 of the receiving member 170 (see FIG. 2) and makes contact with the threaded aperture 180 of the bolt of the capture block.

Next, a racking tool 400 and its side notches is rotatively connected to the outward protrusions or pins 320a on the second end 324 of the shaft 320. An example of a racking tool is shown in FIG. 18. The racking tool 400 includes a rod grasping section 402 which is configured to connect with the one or more of the lateral protrusions or pins 320a of the shaft 320. The racking tool 400 also includes a crank portion 404 and an extended handle 406. The crank portion 404 can be held by a first hand of the operator while the handle 406 is held by a second hand of the operator with the extended handle in the other hand. The operator pushes and pulls (in a circular motion) on the crank portion 404 (while holding the handle 406 rotatably steady) to rotate the racking tool in a first direction or a second direction that is opposite the first direction. It should be noted that the operator may not necessarily be manually rotating the racking tool 400. Indeed, a machine or power drill controlled by the operator may be performing the rotation using its own rod-engaging racking tool.

The racking tool is then rotated in the first direction, which causes the connecting rod member 310 to rotate as well in the first direction. As a result, the fastening rod member 340 is driven into the threaded aperture 180 of the bolt of the capture block, which may have a predetermined length (e.g., a through-hole) to accommodate the fastening rod member 340. More specifically, the helical ridges 346a (and by extension the threaded portion 346) of the fastening rod member 340 mates with the internal grooves 182a (and by extension the threaded portion 182) of the threaded aperture 180. As the fastening rod member 340 is being driven into the threaded aperture 180, the fastening rod member 340 moves the entirety of the circuit breaker 200 on its wheels within the cubicle and further into the hollow interior 112. Such movement is due to the cooperation between the screw threads of the fastening rod member 340, the internal and mating screw threads of the bolt of the capture block 350. As the helical grooves or threads 346a of the fastening rod member 340 interlock (or interlace) with the grooves 358a of the capture block 350 (and the fastening rod member 340 rotates), the block 350 grips and pulls and longitudinally moves the fastening rod member 340. As a result, the block 350 causes the circuit breaker 200 to be pulled and to move into a racked in position. Opposite rotation of the crank tool results in a racked-out position.

In addition, as the circuit breaker 200 moves into the container 110, the trigger arms 250 contact the lever arms 142. The trigger arms 250 cause the lever arms 142 to move to a triggered position, thereby in turn causing the vertical movable plates 144 to move from a protected position to an unprotected position. As a result, the female contacts 130 are exposed for slidably mating with the male contacts 220 of the circuit breaker 200.

Because of the non-threaded section of the rod coming within the threaded aperture of the bolt of the capture block, once the fastening rod member 340 is no longer being pulled into the cabinet, an indication that the fastening rod member 340 and its threads have reached and fully passed through the end of the threaded aperture 180 of the bolt of the capture block, the operator will see and sense that the connecting rod mechanism 300 is no longer pulling the circuit breaker 200 into the case and the fastening rod member 340 is "free" to rotate and no longer effect a racking operation. Further rotation of the rod will not result in any further racking in as the non-threaded part of the rod is then within the threaded part of the capture block. The circuit breaker 200 is now fully engaged and racked in.

When racking out is desired, a slight pull on the horizontal pull bars will engage the rear but then leading thread of the rod with the distal end of the threaded aperture so that further opposite rotation of the rod, by the racking tool, will cause the circuit breaker to rack out until the entire circuit breaker is easily removed, sensed by the operator as the rod is free turning, i.e., no longer is the rod engaged by the screw threads of the aperture of the bolt of the capture block.

The absence of threads on a proximal section of the fastening rod member 340 then has stopped movement of the circuit breaker 200 further back into the cubicle than desired. This eliminates damage to the components. Further, the fastening rod member 340 is calibrated (machined) such that at the end of the rotation of the rod, when the circuit breaker 200 is precisely secured within the switchgear 100, the aperture of the block 350 is aligned with the free or non-threaded portion 348 of the fastening rod member 340. In other words, because the free portion 348 is a smooth and reduced in diameter section vis a vis the threaded surface (e.g., grooves or helical ridges), the fastening rod member 340 (and by extension the connecting rod member 310) rotates freely (in the first or second direction) within the aperture of the bolt without any lateral movement of circuit breaker with respect to the cubicle, case or cabinet. Such free rotation does not cause the circuit breaker 200 to move in either the first in or second out direction.

In other words, to reiterate the aforementioned feature, the connecting rod member 310 is preferably secured to the circuit breaker. It is capable of being rotated in a first direction by the racking tool 400 to cause the circuit breaker to be racked into the cubicle or container 110 of the switchgear 100. The rotation of the connecting rod member 310 in a first direction causes the circuit breaker 100 to glide and move into a racked in position. Initially, the circuit breaker 200 will move as the threaded portion 346 of the fastening rod member 340 is turned into the aperture of the bolt in the capture block and the circuit breaker is thus secured into the case or cavity. While the circuit breaker 200 is moving with its threaded rod portion within the capture block, the circuit breaker 200 is pulled in a racked-in direction. However, once the fastening rod member 340 moves to the free or non-threaded portion 348 being within the threads of the bolt of the capture block (secured to the bolt on the cubicle, cavity or case) there is no longer any inward pulling of the circuit breaker within the case as there are no longer any helical ridges or threads to cause further movement in the racking in direction. As a result, the fastening rod member 340 can freely rotate without causing the circuit breaker to move at all. The helical ridges 346a of the threaded portion 346 of the fastening rod member 340 are configured (or designed) to have a predetermined length, such that once the circuit breaker 200 is secured (or racked into the switchgear 100) to the precise dimension, it cannot be further moved inwardly.

Once the circuit breaker 200 is in a racked in to the switchgear position, the circuit breaker 200 may be racked out from time-to-time due to, for example, maintenance, cleaning, upgrading, repairing, etc. To rack out the circuit breaker 200, the operator may use the racking tool 400 as before. The racking tool 400 is connected to the one or more protrusions 320a of the shaft 320 and rotated in the second direction. However, the capture block 350 may still be on the free or non-threaded portion 346a of the connecting rod as a result of a prior racking in. As a result, the operator may need to slightly pull the racking tool 400 and/or the circuit breaker in the rack out direction (while rotating the rod connecting member 310 in the second direction), and/or allow for movement by engagement of the pull handles. Only a slight movement is required to engage the threaded bolt of the capture block with the threads of the connecting rod. After the contact is made and the threads of the rod grasped by the threads of the bolt of the capture block, the operator may simply rotate the connecting rod member 310 in the second direction until the circuit breaker 200 is racked out from the switchgear 100. The spring bias of the bolt also may ensure immediate engagement of the rod and its threads and the threads of the bold, when it is desired to withdraw the circuit breaker from the cubicle.

The aforementioned specific embodiments are illustrative, and many variations can be introduced on these embodiments without departing from the spirit of the disclosure or from the scope of the appended claims. Further, different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by a person of ordinary skill in the art.

What is claimed is:

1. A mechanism for racking a circuit breaker in and out of a cubicle of a switchgear, the circuit breaker having a front and a rear, the mechanism comprising:
a connecting rod member rotatively secured and extending from the front towards the rear of the circuit breaker, said rod having a distal, external threaded portion and an adjacent and proximal non-threaded portion; and
a capture block secured near either the front or rear of said circuit breaker, said capture block having mating threads to receive the threaded portion of said connecting rod member such that the circuit breaker can move between a racked-in position and a racked-out position with respect to said cubicle of said switchgear by rotating said connecting rod member with respect to said threads of said capture block and said connecting rod member's non-threaded portion ensuring against over racking in of said circuit breaker into said cubicle of the switchgear when said non-threaded portion is aligned with said threads of said capture block.

2. The mechanism according to claim 1, wherein, in a condition where the circuit breaker is in the racked-out position with respect to said cubicle of the switchgear, an axial rotation of the connecting rod member in a first direction causes the circuit breaker to move towards the racked-in position with respect to said cubicle of the switchgear.

3. The mechanism according to claim 1, where said cubicle of said switchgear comprises a floor and the connecting rod member is secured beneath said circuit breaker and said capture block and proximal said floor of said cubicle of the switchgear.

4. The mechanism according to claim 1, wherein said capture block is provided with a spring biasing means tending to push forwardly said mating threads of said capture block towards said front of said cubicle of said switchgear.

5. The mechanism according to claim 1, wherein said connecting rod member comprises a shaft coaxially extending with said connecting rod and one end of said shaft comprises one or more lateral protrusions that are configured to selectively connect with a rotatable racking tool from said front of said cubicle of said switchgear.

6. A switchgear system comprising:
a switchgear including a cubicle; and
a circuit breaker including a mechanism comprising:
an axially rotatable, connecting rod member rotatively secured to either of the circuit breaker or the cubicle and having an external threaded portion and an adjacent non-threaded portion; and
a capture block secured to the other of said circuit breaker or said container to which said connecting rod member is secured, comprising a bolt having internal threads which matingly thread to receive the threaded portion of said connecting rod member such that the circuit breaker can move between a racked in position and a racked out position by rotating said connecting rod member such that after fully racking in said circuit breaker into said container, said non-threaded portion is within the threads of said bolt and ensure against over racking in of said circuit breaker into said cubicle by said non-threaded portion freely rotating within said threads of said bolt.

7. A switchgear system comprising:
a circuit breaker having an access front; and
a cubicle housing, said circuit breaker and said cubicle housing each having at least one set of wheels or and rails for precisely racking in said circuit breaker within said cubicle housing and a front-located, laterally extending across said access front pull handle mechanism secured to said front of said circuit breaker for facilitating inward and/or outward movement of said circuit breaker with respect to said cubicle housing.

8. The switchgear system according to claim 7, wherein a safety locking pull handle is also provided which requires a second direction of manual movement than said first pull handle to disengage said circuit breaker from said cubicle housing and/or disengage brakes of said circuit breaker.

* * * * *